Patented Nov. 12, 1929

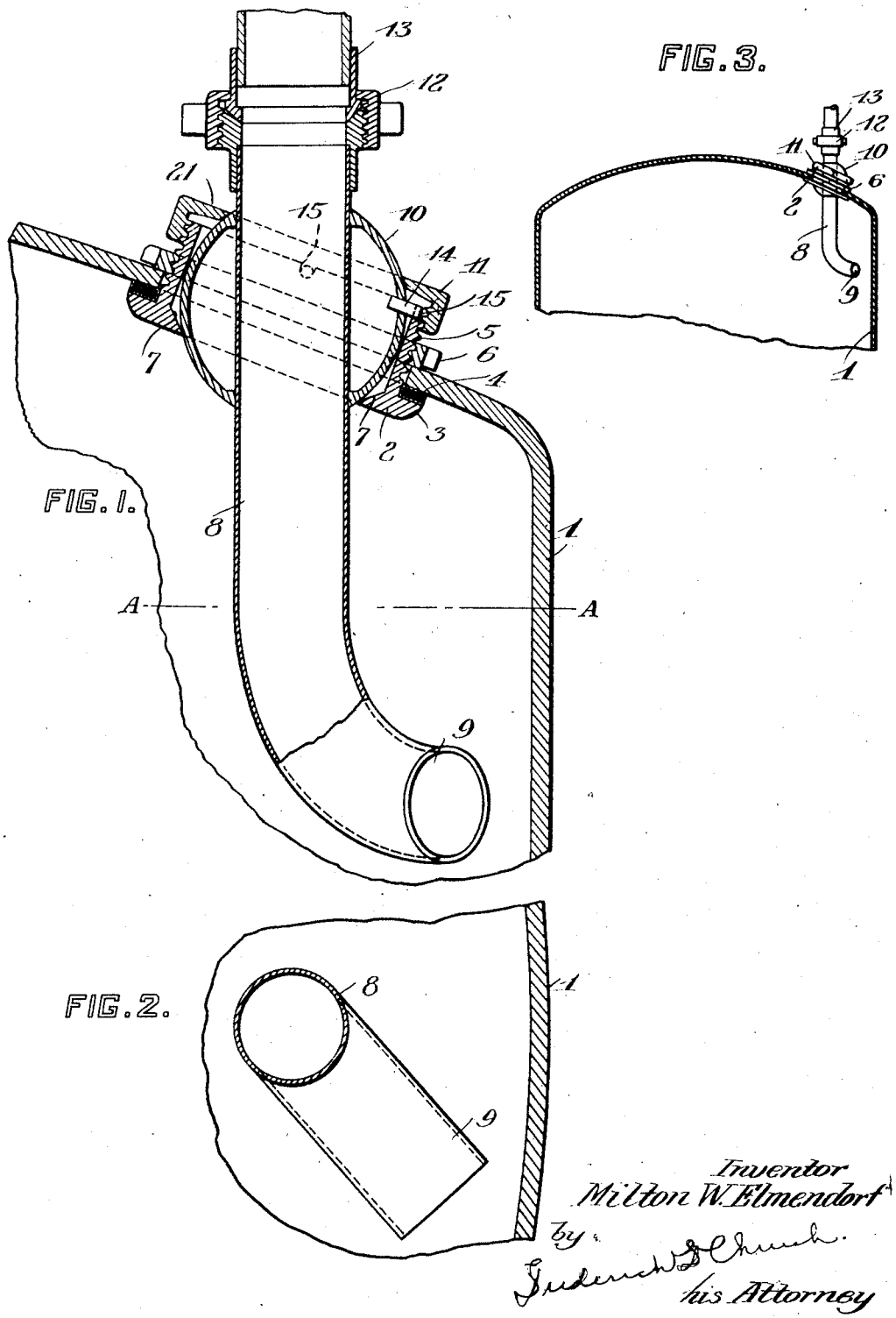

1,734,966

UNITED STATES PATENT OFFICE

MILTON W. ELMENDORF, OF ROCHESTER, NEW YORK, ASSIGNOR TO THE PFAUDLER COMPANY, OF ROCHESTER, NEW YORK, A CORPORATION OF NEW YORK

PIPE CONNECTION FOR VESSELS

Application filed March 23, 1922. Serial No. 546,135.

My present invention has for its object to provide a pipe connection for vessels or containers of such nature that the portion or section of the pipe within the tank may be readily adjusted and maintained with its orifice in any desired relation to the interior wall, and this irrespective of the shape of the portion of the vessel to which it is connected and by which it is supported. The connection is particularly adapted for the inlet pipe for milk containing vessels which have a wholly or partially closed top and in which it is desired to discharge a material passed through the pipe against one of the walls for any desired reason, as for instance to spread liquid such as milk in a thin film on the wall which may be heated, cooled, or for the purpose of preventing undue foaming when the vessel is only partially filled. To these and other ends the invention consists in certain improvements and combinations of parts, all as will be hereinafter more fully described, the novel features being pointed out in the claims at the end of the specification.

In the drawings:

Figure 1 is an enlarged sectional view through the connection and a portion of the tank or container in which it is mounted;

Figure 2 is a horizontal sectional view on the line a—a of Figure 1, and

Figure 3 is a reduced scale section showing the top of a vessel equipped with the complete connection.

Similar reference numerals throughout the several views indicate the same parts.

In passing liquids into tanks or containers, it is often times desirable to cause its discharge at certain places, usually with reference to one of the side walls of the tank so that it will be distributed in a film thereon, not only to prevent excessive foaming or agitation of the contents, but to subject the incoming liquid in this form to the heating or cooling action of the tank wall, and it is desirable that the direction of the entering stream be capable of being changed or varied to suit the particular operation or treatment, and also that the fitting be adapted for ready application to tanks or containers having their upper walls of different shapes or forms. With the object in view therefore of furnishing a device having these characteristics, I provide a fitting adapted for ready application to the tank and having a universally adjustable pipe section mounted therein so that the discharge orifice can be adjusted to the desired position and readily secured.

The tank 1 to which my invention is shown applied may be of any suitable construction, but is preferably of the usual type having a rounded or dome shaped top, provided with the usual opening or manhole to which the fitting is applied. Extending through the opening in the top of the tank is a supporting sleeve 2 having on its inner side a flange 3 between which and the inside of the tank is a packing gasket 4. The exterior of the sleeve is preferably provided with a threaded portion 5 and with a securing nut 6 engaging the outer side of the tank so that when this nut is screwed down, the sleeve will be secured rigidly in position. The inner side of this sleeve is provided with a flange or shoulder 7 which is preferably machined or tapered to a rather thin edge so that it may, when pressure is applied fit tightly against a cooperating ball member or part to be described and overcoming any slight surface irregularities, make a tight joint therewith.

8 indicates the inlet pipe for liquid extending through the top of the tank having a discharge orifice 9 opening at an angle to its longitudinal axis, preferably by bending the end laterally of the main body of the pipe, and above this orifice the pipe is provided with a spherical portion in the form of a shell 10 welded or otherwise secured to its exterior, this spherical shell being greater in diameter than the aperture in the lower portion of the sleeve 2 so that the ledge 7 on said sleeve will support the pipe in all positions of adjustment. An annular nut or collar 11 encircles the pipe 8 above the spherical portion 10 having a flange 21 to engage the upper portion of the latter and threaded to cooperate with the thread on the sleeve. The upper end of the pipe section extending exteriorly of the tank is connected by an ordinary union connection 12 with the main inlet pipe 13. This ball and socket connection between the supporting sleeve and the pipe 8 permits universal adjustment of the pipe 8 to adjust the discharge orifice 9 at any desired angle relative to the wall of the container and then clamped by the collar 11 in any rotary or angular position to produce the best results where it is firmly held, the thin edge 7 making a tight joint. This adjustment may be readily obtained and maintained at whatever angle within reasonable limits, the top of the tank may have relative to the side wall. Thus the pipe 8 may be rotated on its longitudinal axis or tilted or turned in any direction, the thin edge of the flange 7 preserving a tight joint and enabling me to dispense with extra packing.

If it is desired that the pipe 8 be adjusted to one or more certain predetermined positions, there may be suitable indicia between the pipe 8 and the casing or the sleeve 2 so that the position of the orifice can be ascertained from the exterior adjustments or if preferred a retaining pin 14 may be provided upon the ball adapted to engage with a suitable notch or notches 15 in the edge of the sleeve 2 to retain the discharge end of the nozzle in certain predetermined positions relative to the tank wall.

The form of attachment embodying the ball and socket connection has been found in practice to be admirably adapted for the purpose and may be readily applied to closed tanks having differently shaped tops, or to open top tanks having a flange extending in a more or less horizontal direction.

The pipe 8 may be readily removed for cleansing purposes when desired.

I claim as my invention:

1. In a pipe connection for tanks, the combination with a sleeve having an exterior flange and an interior metallic flange with a relatively thin edge, a nut on the sleeve opposite the first mentioned flange, of a pipe extending through the sleeve having a discharge orifice at one end, a spherical portion resting upon the thin edge of the interior flange of the sleeve, and a securing collar threaded upon the exterior of the sleeve and engaging the spherical portion above its center.

2. In a pipe connection for tanks, the combination with a sleeve having a recess in its outer portion and a collar adjustable on the sleeve, each of said parts having inwardly extending flanges, of a pipe extending through the sleeve and a spherical exterior portion thereon arranged to be clamped between the collar and sleeve and a projection on said portion adapted to enter the recess and hold the pipe in adjusted position.

MILTON W. ELMENDORF.